United States Patent [19]

Loizeau

[11] 4,376,477
[45] Mar. 15, 1983

[54] TORSION DAMPING DEVICE PARTICULARLY CLUTCH FRICTION MORE ESPECIALLY FOR MOTOR VEHICLE

[75] Inventor: Pierre Loizeau, Ville d'Avray, France

[73] Assignee: Societe Anonyme Francaise du Ferodo, Paris, France

[21] Appl. No.: 123,458

[22] Filed: Feb. 21, 1980

[30] Foreign Application Priority Data

Feb. 23, 1979 [FR] France ............................. 79 04719

[51] Int. Cl.³ .................................................. F16D 3/66
[52] U.S. Cl. .................................... 192/106.2; 464/68
[58] Field of Search ............... 192/106.2, 106.1, 103 B, 192/103 C, 105 BA, 105 BB; 64/25, 27 S

[56] References Cited

U.S. PATENT DOCUMENTS

| 3,811,545 | 5/1974 | Sato et al. | 192/106.1 |
| 4,122,931 | 10/1978 | Maucher | 192/106.2 |

FOREIGN PATENT DOCUMENTS

| 2361574 | 3/1978 | France | 192/106.2 |
| 1426885 | 3/1976 | United Kingdom . | |

*Primary Examiner*—George H. Krizmanich
*Attorney, Agent, or Firm*—Charles A. Brown

[57] ABSTRACT

A torsion damping assembly comprises two coaxial parts mounted for relative angular movement within predetermined limits of angular displacement. Circumferentially acting springs are operative between the parts in a range of angular displacement. An intervening element is responsive to centrifugal force for movement from a standby position to an operative position above a predetermined structural speed and is urged back toward the standby position in the operative position. The intervening element directly or indirectly circumferentially bears against one of the coaxial parts to define a circumferential abutment for one of the resilient elements in the operative position to modify the operational characteristics of the assembly.

28 Claims, 32 Drawing Figures

FIG. 22
FIG. 20
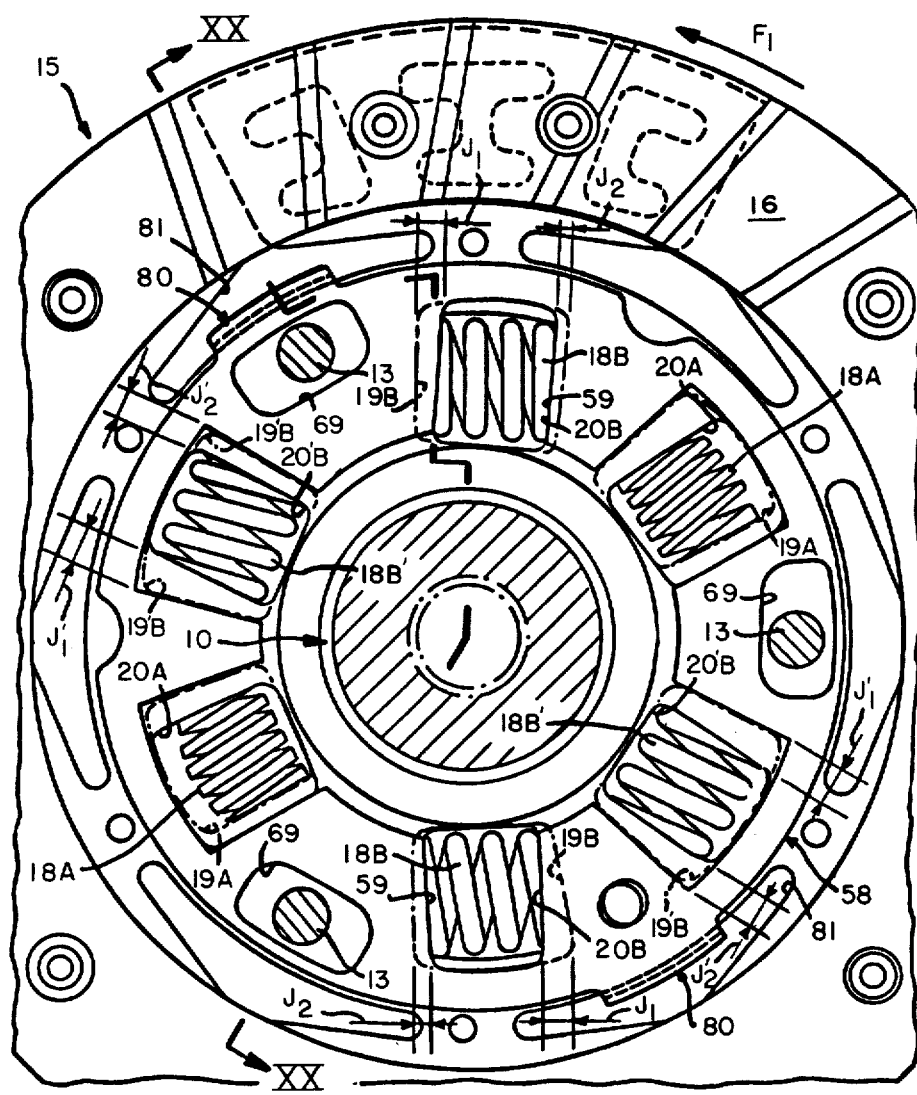
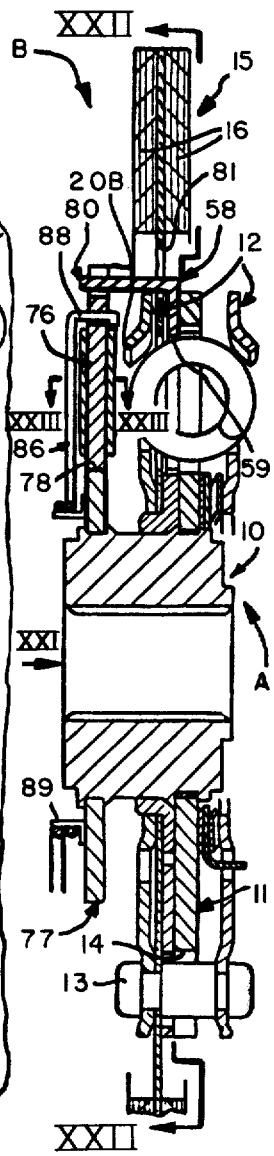
FIG. 23
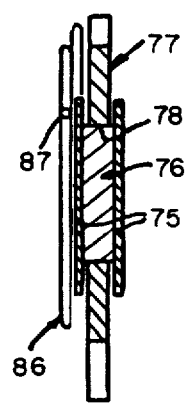

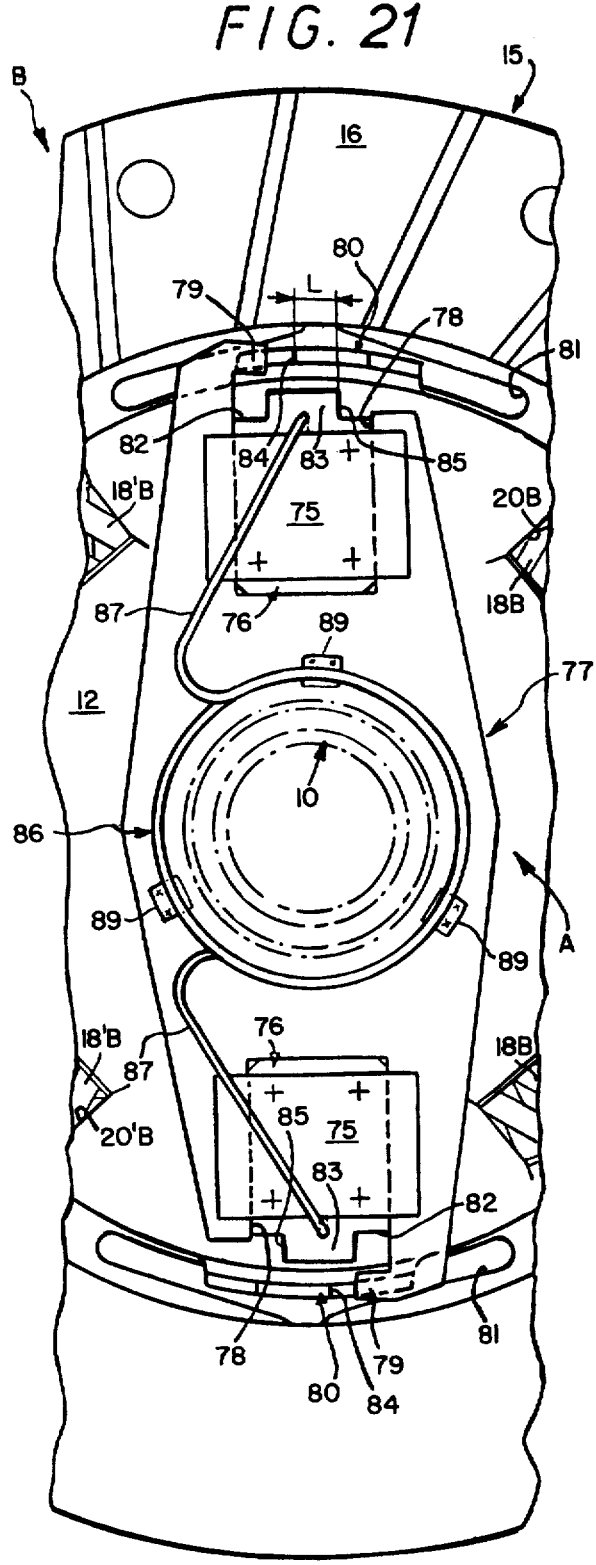
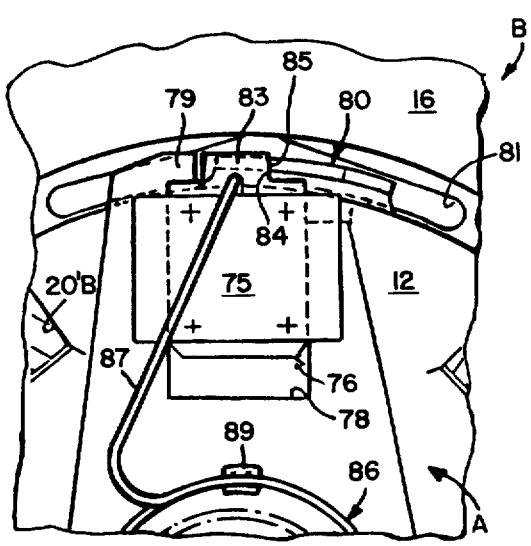

TORSION DAMPING DEVICE PARTICULARLY CLUTCH FRICTION MORE ESPECIALLY FOR MOTOR VEHICLE

The present invention relates in a general way to torsion damping devices which comprise at least two coaxial parts mounted mutually rotatably within the limits of a definite angular play and counter to elastic elements adapted to act circumferentially between them, hereinafter called circumferentially effective elastic elements, for at least one range of said angular play.

In practice, each of the parts in question comprises an annular piece, mutually parallel, and the elastic elements provided between them are each individually housed partly in a port of the annular piece of one of said parts and partly in a port of the annular piece of the other of them.

As is known, such a torsion damping device is customarily involved in the construction of a clutch friction means, especially for motor vehicles, in which case one of its rotary parts then carries a friction disc intended to be made integral in rotation with a first shaft, in practice a driving shaft, the output shaft of an engine, whereas another of said rotary parts is carried by a hub intended to be made integral in rotation with a second shaft, in practice a driven shaft, the input shaft of a gearbox.

Such a device in fact permits a regulated transmission of the torque applied to one of its rotary parts when the other is itself the object of a torque, that is to say to filter the vibrations which may arise all along the kinematic chain, extending from the engine to the driven wheel shafts, in which it is inserted.

As is likewise known, it is advantageous, at least for certain applications, and especially for that relating to clutch friction means for motor vehicles, that for low values of the angular play between the two rotary parts constituting such a torsion damping device, the torque transmitted between them should remain small.

Indeed, this arrangement, which involves the use of circumferentially effective elastic elements of low rigidity for the low torque values, especially permits eliminating the gearbox noises in neutral, with the relevant vehicle stationary, hereinafter called neutral noises, especially when hot.

And it is clear that, at least in some degree, it is desirable from this standpoint alone that the range of angular play during which said elastic elements of low rigidity act in this way should be as wide as possible.

In practice, in order that the elastic elements of low rigidity are actually the only ones to act for the low torque values, the ports of the annular pieces of the two coaxial parts constituting the torsion damping device in question have one and the same circumferential length from one of said parts to the other, whereas for the other elastic elements interposed between the same, which have higher rigidity, the ports of the annular piece of the driving part in which said elastic elements are housed have a different circumferential length from that of the corresponding ports of the annular piece of the driven part.

Thus as soon as, a gear being engaged, an action is exerted upon the accelerator of the relevant vehicle, with a view to "on haul" opperation of the assembly, the elastic elements of high rigidity act only after the circumferential clearance between the corresponding edges of the ports in which they are housed, from the driving part to the driven part, has been taken up.

Likewise when, the action upon the accelerator being suspended, the torque between the two rotary parts constituting the torsion damping device in question changes direction, the operation of the assembly then becoming of the so-called "pull-back" type, the elastic elements of high rigidity, previously compressed between driving part and driven part, expand until, regaining abutment at each of their ends against the edges of the ports of the driven part in which they are housed for the stationary configuration of the assembly, which are those of shorter circumferential length, they once more permit the elastic elements of low rigidity to act alone, then become recompressed, and vice versa when an action is once more exerted upon the accelerator.

In practice, when the action upon the accelerator is suspended the change in direction of the torque is quasi instantaneous.

Now, in whichever direction it may be, the elastic elements of low rigidity which act each time for the low torque values become saturated very rapidly.

This therefore results, when the action upon the accelerator is suspended or is exercised afresh, in an instantaneous and noisy rocking of one of the two constituent parts of the relevant torsion damping disc with reference to the other, said rocking corresponding to the taking up of clearance to be made between the said parts due to a saturation, firstly in one direction then in the other, of the elastic elements of low rigidity acting between them.

The noise by which this rocking is accompanied is, in practice, the more intense as, firstly, the range of angular play between the two rotary parts in question corresponding to the low rigidity elastic elements is greater, and secondly, the gear ratio engaged is shorter.

There are thus two contradictory desiderata to be reconciled, the one relating to the adoption of a range of angular play in which, at low torque values, only the circumferentially effective elastic elements of low rigidity act, for good absorption of the neutral noises, especially for diesel-engined vehicles, the slow regime of which is particularly low and the cyclic accelerations particularly high, the other relating to the taking up of angular clearance customarily associated with such a range during the change from "on haul" operation, with accelerator depressed, to "pull-back" acceleration, accelerator relaxed, and vice versa, such a taking up of angular clearance being itself creative of noise, and the latter being the louder as said range is itself wider.

The present invention has generally speaking as its object an arrangement permitting this difficulty to be overcome.

More specifically, it has especially as its object a torsion damping device, particularly a clutch friction means, especially for motor vehicle clutches, of the type comprising at least two coaxial parts fitted mutually rotatably within the limits of a definite angular play and counter to elastic elements adapted to act circumferentially between them for at least one range of said angular play, said torsion damping device being characterised in that it comprises at least one element, hereinafter called the intervening element, which is sensitive to centrifugal force counter to return means and which is thus reversibly movable between a standby position for which it is inoperative, and, above a definite speed of rotation associated with said return means, an operative position for which, abutting circumferentially directly or indirectly upon any one of said parts, it is adapted to supply a circumferential abutment to at least one of said elastic elements, so that the functional characteristics of the device are thereby modified.

It is of course already known to associate any element sensitive to centrifugal force with a clutch.

This arrangement is described e.g., in French Pat. Nos. 1,113,600 and 1,185,946.

However, in both these patents, the element sensitive to centrifugal force co-operates with an element external to the clutch friction means, acting e.g., between the hub of the latter and one of the plates between which its friction disc is arranged, in practice the reaction plate or flywheel of the clutch.

According to the invention, such a centrifugal element acts in the very heart of the torsion damping device or clutch friction means in question, co-operating with two elements both belonging to said torsion damping device.

According to a first possible embodiment of the invention, the intervening element according to the invention is carried by one of the coaxial rotary parts constituent of the relevant torsion damping device and it is adapted to supply in itself, in the operative position, a circumferential abutment to at least one of the elastic elements interposed between the said parts.

As a variant, according to another possible embodiment of the invention, there are associated with the intervening element according to the invention, firstly an abutment element which extends axially and with which it is adapted to come into positive circumferential abutment in the operative position, and secondly an annular plate which is engaged by recesses such as ports or grooves upon the elastic elements provided between the coaxial rotary parts constituent of the relevant torsion damping device, without circumferential clearance for at least that of said elastic elements which is involved, i.e., that with which the intervening element is required to co-operate, and with a circumferential clearance for the other elastic elements, and which forms a piece carrying any one of said intervening and abutment elements whereas the other is integral with a piece belonging to any one of said parts, so that in this case it is through the intermediary of said annular plate that the intervening element is adapted to supply a circumferential abutment to at least the said elastic element in question.

Be that as it may, in neutral with the vehicle stationary, the torsion damping device in question rotates only at low speed, and the intervening element sensitive to centrifugal force which it comprises according to the invention is then inoperative: the circumferentially effective elastic elements of low rigidity and of high rigidity provided between the two rotary parts constituent of said device then all act freely between the latter, for the entire range of angular play which is allotted to them, irrespectively of the width of said range.

On the other hand when, with the vehicle in motion, said torsion damping device rotates at a sufficient speed, the intervening element according to the invention changes of itself, by the effects of centrifugal force, from its previous standby position, here called for convenience the standby retracted position, into its operative position, here called for convenience the operative deployed position, and for the latter a circumferential abutment is made available for the relevant elastic elements, which is in practice an elastic element of high rigidity, so that the relaxed deployment of the latter is interrupted.

It is as though the specific geometry of the relevant torsion damping device, associated with the circumferential clearance from driving part to driven part, between the ports in which the elastic elements are housed, were modified for at least one of the latter.

In other words, it is as though, for the relevant elastic element, the circumferential length of the port of the annular piece of that of the two coaxial rotary parts in which it is partly housed were capable of assuming either of two values, the one when the intervening element according to the invention is in the standby retracted position, the other when the intervening element is in the operative deployed position.

In this context the present invention also has as its object a torsion damping device, particularly clutch friction means, of the type comprising at least two coaxial parts mounted mutually rotatably within the limits of a definite angular play and counter to elastic elements adapted to act circumferentially between them for at least one range of said angular play, each of said parts comprising an annular piece, mutually parallel, and said elastic elements being each individually housed partly in a port of the annular piece of one of said parts and partly in a port of the annular piece of the other of said parts, characterised in that it comprises at least one element, hereinafter called for convenience intervening element, which is sensitive to centrifugal force counter to return means, and which is thus reversibly movable between a standby position, for which it is inoperative, and, beyond a definite speed of rotation associated with its return means, an operative position for which, for at least one of said elastic elements, it substitutes itself either directly or indirectly for one of the radial edges of one of the ports in which said elastic element is housed.

It is clear from the foregoing that, according to the position of the intervening element according to the invention, and hence according to the speed of rotation of the relevant torsion damping device, the functional characteristics of the latter are different.

In fact, when the intervening element according to the invention is in the operative deployed position, the action of the elastic elements is modified, and parrticularly, the elastic elements of low rigidity are prevented from acting alone for the low torque values.

Thus all noise is prevented during a change from "on haul" operation to "pull-back" operation, and this irrespectively of the width of the range of angular play in which the elastic elements of low rigidity act for the neutral position at standstill.

Consequently this range can be made as wide as is necessary for good absorption of the neutral noises.

The characteristics and advantages of the invention will further emerge from the description to be given hereinbelow by way of example and with reference to the accompanying schematic drawings, wherein.

Figure 1:
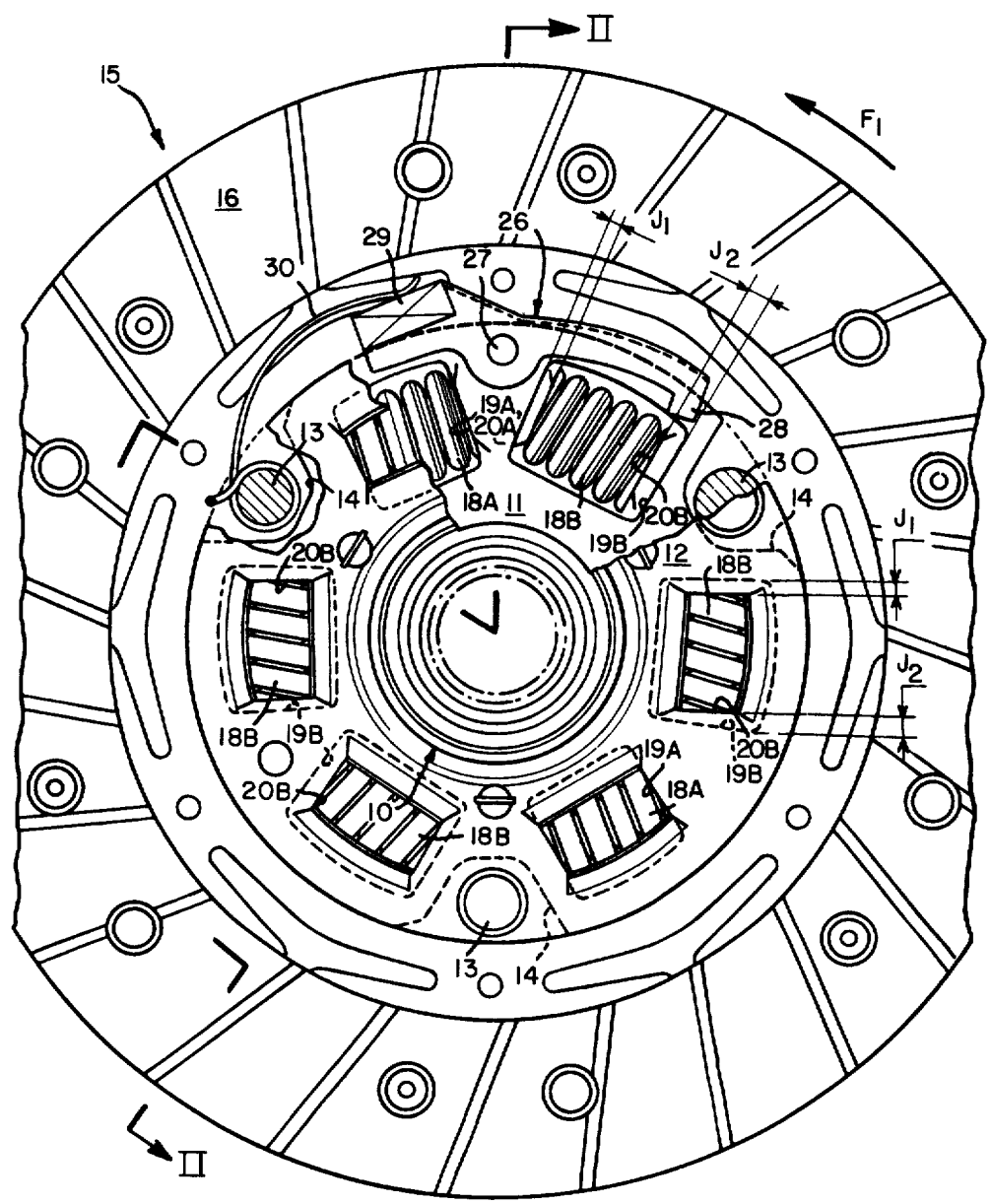
FIG. 1 is a partial view in elevation, with local fragmentation, of a torsion damping device according to the invention, illustrated at standstill.
Figure 2:
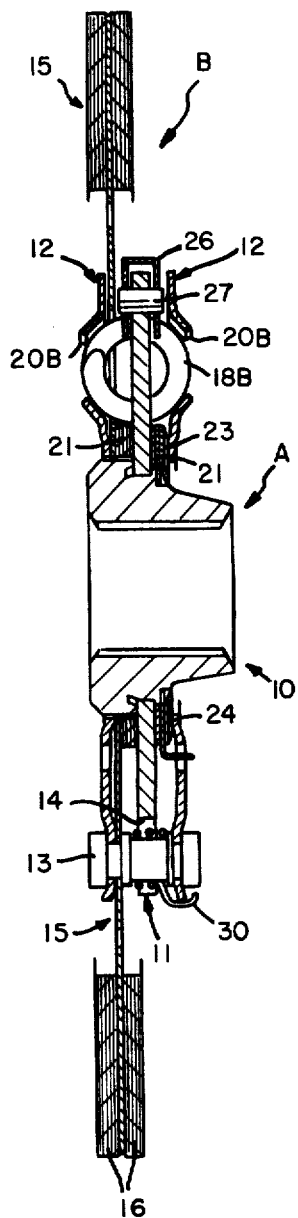
FIG. 2 is a view of the same in axial section, made along the dash line II—II of FIG. 1.
Figure 3:
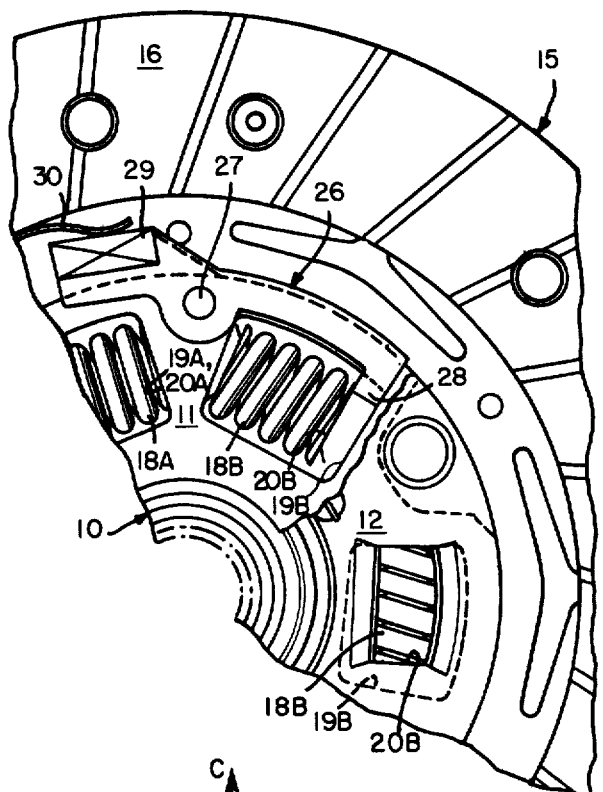
Figure 4:
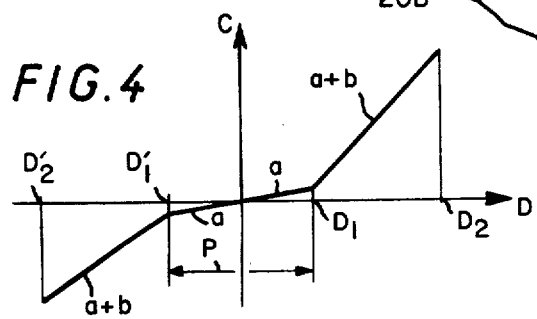
Figure 5:
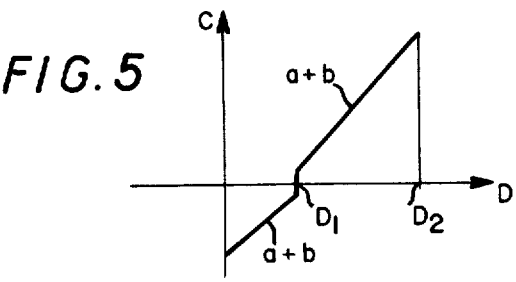
Figure 12:
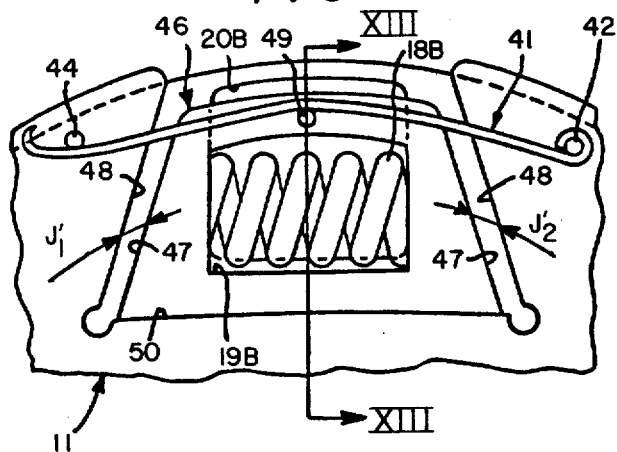
Figure 14:
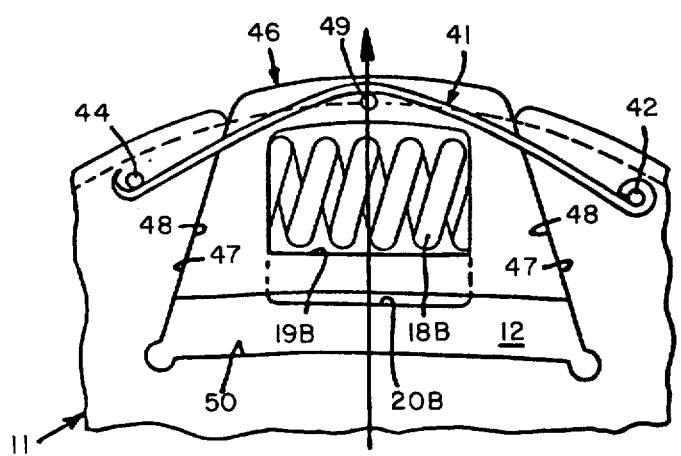
Figure 16:
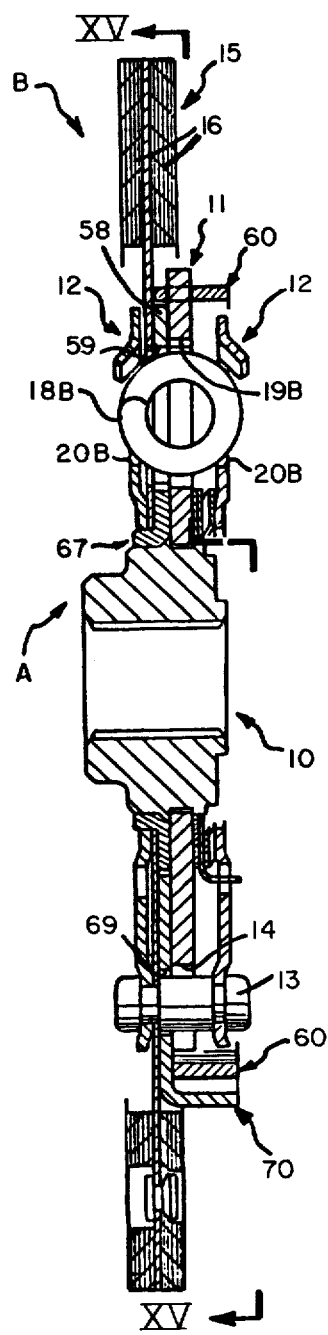
Figure 15:
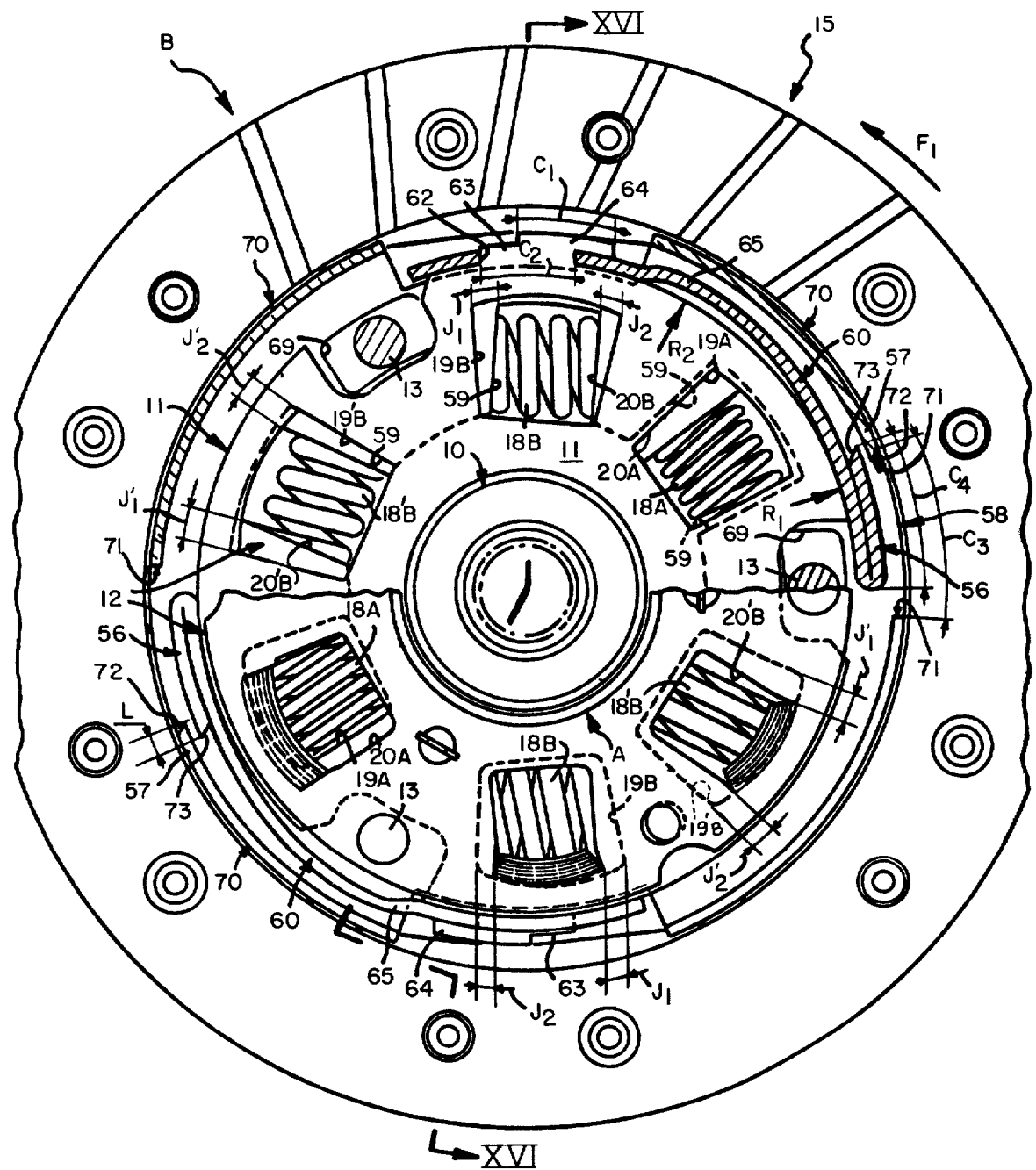
Figure 17:
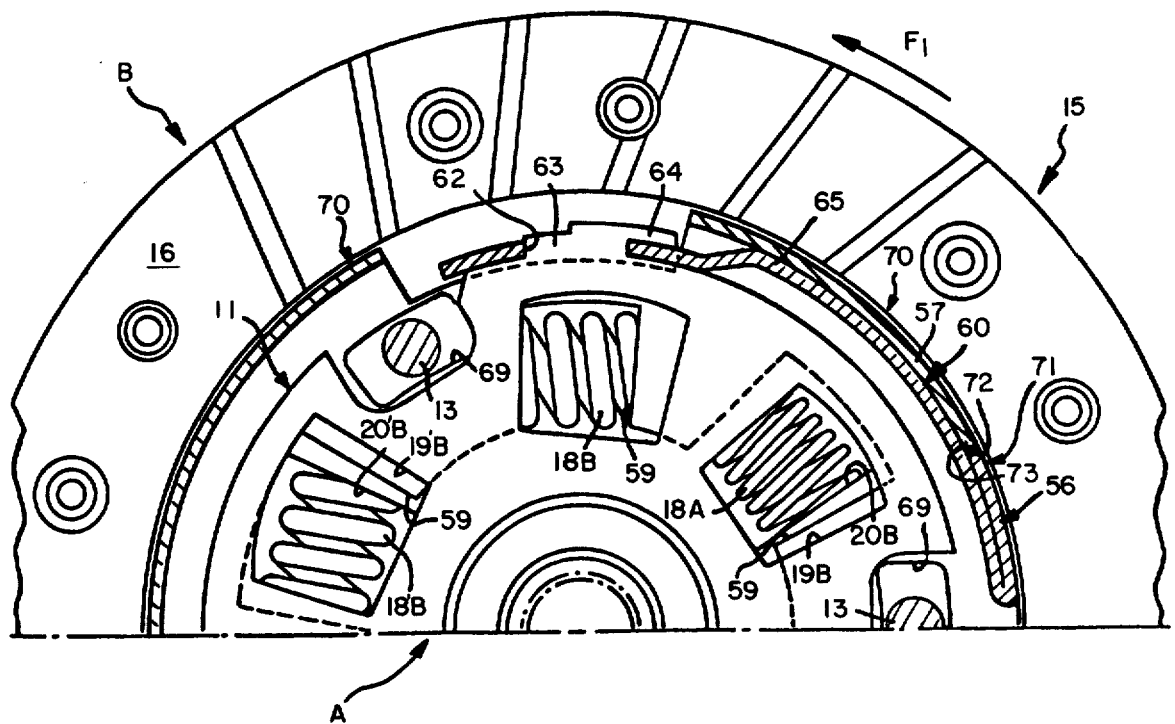
Figure 18:
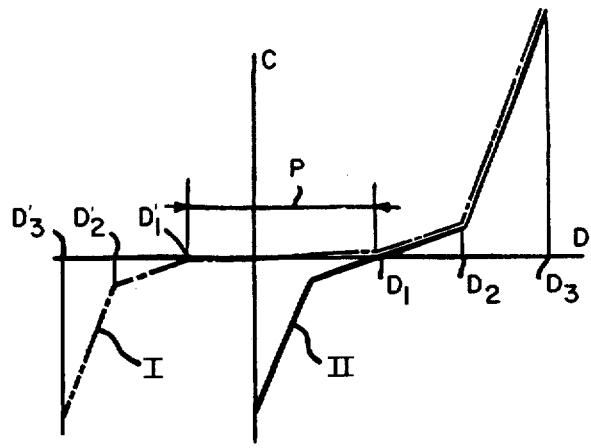
Figure 19:
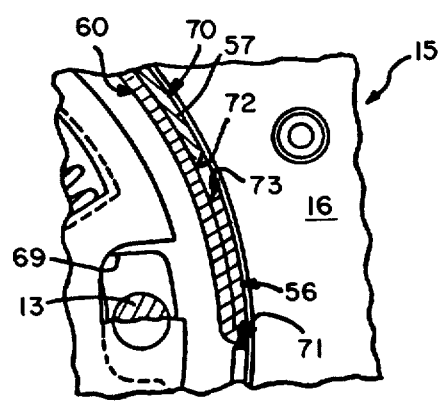

FIG. 3 partly repeats FIG. 1, the relevant torsion damping device being imagined in rotation;

FIGS. 4 and 5 are graphs illustrating the mode of functioning of the torsion damping device according to the invention;

FIGS. 6-7, 8-9, 10-11, 12-13 respectively repeat in part FIGS. 1-2 and respectively relate to different variants of embodiment;

FIG. 14 is a view similar to that of FIG. 12, the relevant torsion damping device being imagined in rotation;

FIG. 15 is a partial view in sectioned elevation, made along the dash line XV—XV of FIG. 16, and with local fragmentation, of another torsion damping device according to the invention, illustrated at standstill;

FIG. 16 is an axial view of said torsion damping device made along the dash line XVI—XVI of FIG. 15;

FIG. 17 partly repeats FIG. 15, the relevant torsion damping device being imagined in rotation;

FIG. 18 is a graph illustrating the mode of functioning of said torsion damping device;

FIG. 19 partly repeats FIG. 17 and relates to another phase of functioning of the relevant torsion damping device;

FIG. 20 is a view in axial section, made along the dash line XX—XX of FIG. 22, of another torsion damping device according to the invention;

FIG. 21 is a partial view of the same in elevation, in the direction of the arrow XXI of FIG. 20;

FIG. 22 is a partial view of the same in cross-section, made along the broken line XXII—XXII of FIG. 20;

FIG. 23 is a partial view of the same in cross-section, developed flat, along the line XXIII—XXIII of FIG. 20;

FIG. 24 partly repeats FIG. 21, the relevant torsion damping device being imagined in rotation;

FIGS. 25 to 32 are half-views in schematic axial section of various types of torsion damping devices to which the invention may be applied.

These figures illustrate in a general way the application of the invention to the construction of a damper hub clutch friction means.

As is known, such a clutch friction means generally comprises a hub 10, a hub disc 11 forming radially an annular piece surrounding the hub 10, two annular guide washers 12 which extend parallel to the hub disc 11, on either side thereof, around the hub 10, and which are mutually connected by axial columns 13 crossing the hub disc 11 by virtue of the grooves 14 made at the circumference of the latter for that purpose, and a friction disc 15 which carries friction linings 16 on its circumference, on either side thereof.

In the exemplary embodiment illustrated in FIGS. 1 to 3, the friction disc 15 is integral with the guide washers 12, being attached to one of the latter by the same columns 13 which mutually integrate said guide washers 12, the guide washers 12 are freely rotatable about the hub 10 within the limits of a definite angular play, as will appear hereinbelow, and the hub disc 11 is integral with the hub 10.

Such a clutch friction means thus comprises two coaxial parts fitted mutually rotatably within the limits of the definite angular play mentioned hereinbefore, namely a part A constituted by the hub 10 and the hub disc 11, and a part B constituted by the guide washers 12 and the friction disc 15, and, mutually parallel, said parts A, B comprise at least one annular piece, namely the hub disc 11 for the part A and either one of the guide washers 12 for the part B, FIG. 2.

The angular play between the parts A, B thus constituted occurs counter to elastic elements 18A, 18B, which are each adapted to act circumferentially between them for at least one range of said angular play, and which are each individually housed partly in a port 19A, 19B of the hub disc 11 and partly in ports 20A, 20B of the guide washers 12.

In the exemplary embodiment illustrated they are helicoidal springs generally tangentially elongate with reference to a circumference of the assembly.

For the springs 18A, which are springs of relatively low rigidity, and which are two in number in the exemplary embodiment illustrated, being arranged in mutually diametrally opposite positions, the circumferential length of the port 19A of the hub disc 11 in which they are housed is equal to that of the ports 20A of the guide washers 12 in which they are likewise housed.

On the other hand, for the springs 18B, which are springs of relatively high rigidity, and which are four in number in the exemplary embodiment illustrated, the circumferential length of the ports 19B of the hub disc 11 is greater than that of the ports 20B of the guide washers 12, so that between the corresponding radial edges of said ports there exists a circumferential clearance J1 for the direction of rotation of the friction means which, as illustrated by an arrow F1 in FIG. 1, corresponds to the latter's "on haul" operation, and a circumferential clearance J2 for the inverse direction of rotation which corresponds to the "pull-back" operation of said friction means.

For example, and as illustrated, the circumferential clearance J1 may be smaller than the circumferential clearance J2.

In the exemplary embodiment illustrated, the clearances J1, J2 are identical for all the high rigidity springs 18B, but obviously this may be otherwise.

In the exemplary embodiment illustrated, the friction means comprises two friction washers 21 which are arranged each respectively on either side of the hub disc 11, in contact therewith, and an undulate washer 23 with axial elasticity which, abutting against a guide washer 12, acts upon the corresponding friction washer 21 through the intermediary of a distributor washer 24 keyed in rotation on said guide washer 12.

Such a clutch friction means is well known per se; it will not be described in greater detail here.

Its function is likewise well known.

It is illustrated by the graph in FIG. 4, in which the angular play D between the parts A, B is plotted as abscissa and the torque C transmitted from one of said parts to the other as ordinate.

When a driving torque is applied to the part B in the direction of the arrow F1 of FIG. 1, it is progressively transmitted to the part A by the springs 18A, 18B.

In a first stage, for low torque values, and this is the case in neutral with the vehicle stationary, only the low rigidity springs 18A act to eliminate the corresponding neutral noises, the high rigidity springs 18B being distant from the corresponding edge of the ports 19B of the hub disc 11 in which they are housed due to the circumferential clearance J1 specified hereinbefore (straight line a in the graph).

In a second stage, as soon as, during "on haul" operation, the torque increases, the low rigidity springs 18A become saturated and the circumferential clearance J1 is absorbed for a value D1 of the angular play corresponding to said circumferential clearance J1.

The high rigidity springs 18B then come into action until their saturation, which occurs for a value D2 of the angular play constituting its corresponding limit (straight line a+b in the graph).

In the case of "pull-back" operation an analogous process occurs, the springs 18A, 18B which were previously compressed relaxing at first until the circumferential clearance J1 reappears for the high rigidity springs 18B, then, as soon as the torque disappears and becomes negative, which is quasi instantaneous, becoming recompressed, the low rigidity springs 18A being the first ones to recompress, and the high rigidity springs 18B acting only for an angular play D'1 correspond to the absorption of the circumferential clearance J2 specified hereinbefore.

Generally, the low rigidity springs 18A thus act alone in a neutral noise filtration zone P extending from the "on haul" angular play D'1 to a "pull-back" angular play D'1, and the high rigidity springs 18B add their efforts to the low rigidity springs 18A only on either side of said neutral noise filtration zone P.

Obviously, in order to simplify the graph in FIG. 4, no account has been taken here of the hysteresis phenomenon which is produced conjointly because of the internal frictions of the friction means.

According to the invention there is incorporated in such a damper hub clutch friction means, which therefore comprises two coaxial parts A, B mounted mutually rotatably within the limits of a definite angular play and counter to elastic elements 18A, 18B adapted to act circumferentially between them for at least one range of the said angular play, an intervening element 26 which is sensitive to centrifugal force and counter to return means and which is thus reversibly movable between a standby retracted position, for which it is inoperative, and above a definite speed of rotation associated with said return means, an operative position for which, abutting circumferentially, either directly or indirectly, against either of said parts A, B, it is adapted to supply a circumferential abutment to at least one of said elastic elements 18A, 18B so that the functional characteristics of the assembly are thereby modified.

In the exemplary embodiment illustrated in FIGS. 1 to 3, only one intervening element 26 is provided.

Said intervening element 26 is carried by the part A and it is adapted to supply in itself a circumferential abutment to one of the high rigidity springs 18B, as will become apparent hereinbelow.

In practice, in the exemplary embodiment illustrated in FIGS. 1 to 3, the intervening element 26 has the shape of a stirrup and, being engaged radially on the hub disc 11 at the circumference of the latter it is fitted rotatably on said hub disc 11, about an axis 27 parallel to the axis of the assembly; it therefore abuts circumferentially by its axis 27 against the hub disc 11.

At one of its ends it comprises a nose 28 whereby, in the operative position, FIG. 3, it is capable of hooking circumferentially upon the high rigidity spring 18B in question.

At its other end it carries an inertia block which increases its sensitivity to centrifugal force, and which is acted upon by a spring 30 which is carried by one of the axial columns 13, abutting against a guide washer 12, and which constitutes the return means associated with the intervening element 26.

For relatively low values of the speed of rotation of the friction means, below e.g., 900 r.p.m, the intervening element 26 remains in the standby retracted position, FIG. 1, in which its retaining nose 28 is distant from the high rigidity spring 18B in question.

The function of the friction means is then that described hereinbefore, and the representative graph of said function is that of FIG. 4.

For higher values of the speed of rotation of the friction means, e.g., above 1,100 r.p.m., the intervening element 26 moves due to the effects of centrifugal force into its operative deployed position, FIG. 3.

Then, if the function of the assembly changes from a "on haul" mode of operation to a "pull-back" mode of operation, the retaining nose 28 of the intervening element 26 is interposed in the path followed by the corresponding end of the high rigidity spring 18B in question during its relaxed deployment characteristic of such a change, so that the relaxed deployment of said high rigidity spring 18B is thereupon interrupted.

For the sake of simplicity it will be assumed hereinbelow, firstly that said interruption of the relaxed deployment of the high rigidity spring 18B in question occurs for the angular play D1 specified hereinbefore, and that said high rigidity spring 18B has, at rest, a pretension greater than the rigidity of the low rigidity springs 18A.

Said high rigidity spring 18B, then in abutment, on the one hand by one of its ends against the nose 28 of the intervening element 26 according to the invention, which is attached to the hub disc 11, and on the other hand, by the other of its ends, against the guide washers 12 and the hub disc 11, and therefore stressed in compression, momentarily opposes the relaxation of the low rigidity springs 18A.

This results in a modification of the functional characteristics of the friction means compared to what they were previously, the intervening element 26 according to the invention having been substituted, for the spring 18B in question, for the corresponding radial edge of the port 19B of the hub disc 11 in which it is housed, and it being as though the circumferential length of said port were thus modified.

In practice, this modification is expressed, in the graph in FIG. 5, by an abrupt decline of the torque for the angular play D1, then by the continuance of the decrease of said torque and of the angular play along a slope greater than that resulting from the rigidity of the low rigidity springs 18A alone.

Said low rigidity springs 18A are thus prevented from acting alone for low torque values when the speed of rotation of the friction means is above 1,100 r.p.m., which prevents any noisy rocking of said friction means during the change from on haul operation to pull-back operation.

If the high rigidity spring 18B with which the intervening element 26 co-operates has no pretension at rest, the decline in torque for the angular clearance D1 does not occur along a substantially vertical straight line, as previously, but along a slightly inclined straight line.

Obviously, a plurality of high rigidity springs 18B may be involved by the intervention of one or more intervening elements 26, and in practice, at least two intervening elements 26 are provided in mutually symmetrically opposite positions, in order to prevent their intervention inducing any radial component upon the axis of the assembly.

However, for some applications at least, it may be advantageous for the number of springs 18B affected by the intervention of one or more intervening elements according to the invention to be such that a radial component upon the axis of the assembly does result therefrom.

Indeed, a variable radial hysteresis develops in this case, the radial movement of the part B with reference to part A due to such a radial component inducing a radial friction either between the guide washers 12 and the friction washer 21, or between the friction washers 21 and the hub disc 11.

For other applications it may even be advantageous for all the springs 18B present to be involved by the intervention of one, or more, intervening elements according to the invention; this in fact results in the obtention of a particular hysteresis, said springs acting conjointly, and en bloc, at constant torque, for a portion of the angular play between the relevant parts A, B.

Figure 6:
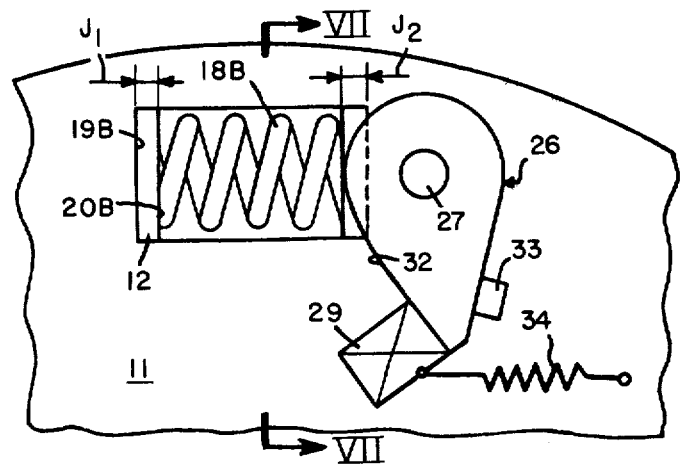
Figure 7:
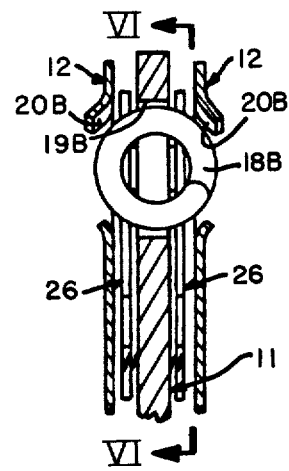

According to the variant of embodiment illustrated in FIGS. 6 and 7, the intervening element 26, which is rotary as previously, is reduced to two flanges, each weighted by an inertia block 29, and it comprises, for co-operation with a spring 18B, on that side of the end thereof corresponding to the circumferential clearance J1, a cam surface 32 whereby, in the operative deployed position, it is capable of supplying a circumferential abutment to such a spring 18B.

Thus the intervention of said intervening element, instead of occurring all or nothing as previously, occurs progressively in this case, and it is as though the circumferential length of the port 19B of the hub disc 11 in which the relevant spring 18B is housed were progressively variable as a function of the speed or rotation of the friction means.

A fixed stop 33 carried by the hub disc 11, and towards which a return spring 34 urges the rotary intervening element 26, then defines the standby retracted or rest position of the latter, and between said standby retracted position and the corresponding operative deployed position, the radial length of the cam surface 22 with reference to the axis 27 is increased by a distance corresponding at least to the circumferential clearance J1.

In the variants of embodiment illustrated in FIGS. 8 to 11, there is an intervening element 36 fitted generally radially movably on the hub disc 11 and exhibiting, in circumferentially opposite positions, two shoulders 37, 38, the first for cooperation with a stop 39 integral with said hub disc 11, the second for co-operation with a spring 18B, on the side of the later corresponding to the circumferential clearance J1, as previously.

Figure 8:
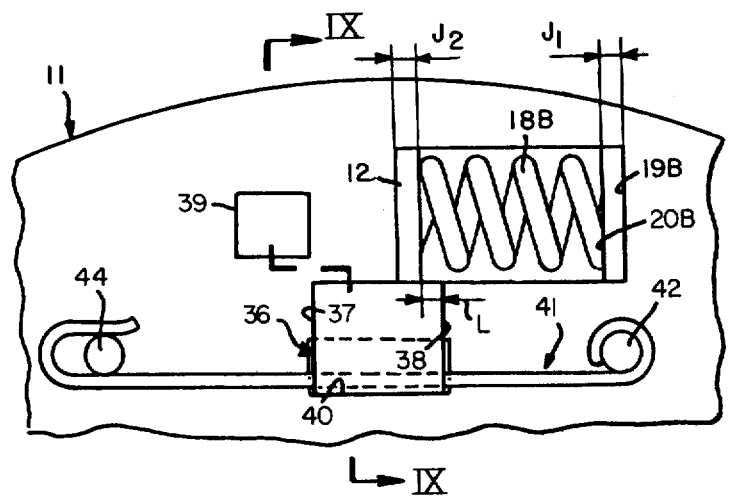
Figure 9:
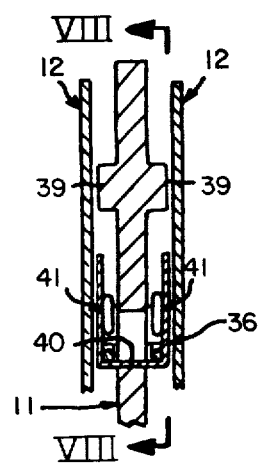
Figure 10:
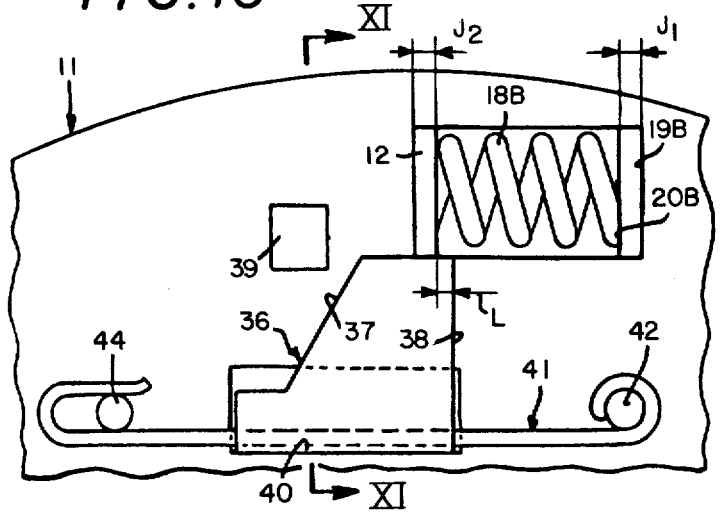
Figure 11:
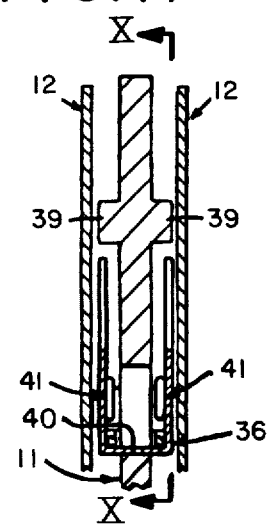

According to the embodiment illustrated in FIGS. 8 and 9, said two shoulders 37, 38 are mutually parallel; as a variant, FIGS. 10 and 11, they are mutually oblique for a progressive action of the relevant intervening element 36.

Be that as it may, in each of these two embodiments such an intervening element assumes e.g., the form of a stirrup, the median section of which crosses the hub disc 11 by virtue of a recess 40 provided therein for that purpose and adapted to give it appropriate radial guidance, and the return means which are associated with it comprise, on each side of the hub disc 11, a flexure spring 41 which is harnessed fixed by one end to the hub disc 11 on a projecting stud 42 carried by the latter, and is harnessed with clearance at the other end, after crossing the intervening element 36, by a buttonhole type engagement on a projecting stud 44 likewise carried by the hub disc 11; such a flexure spring is provided on each face of the hub disc 11.

The shoulder 38 of said intervening element 36 is circumferentially at a distance L from the corresponding lateral edge of the ports 20A, 20B of the guide washers 12 which corresponds angularly at least to the circumferential clearance J1, and in the case of the embodiment of FIGS. 8, 9 its shoulder 37 is radially substantially in line with the corresponding lateral edge of the stop 39, for abutment thereon.

In these embodiments the intervening element 36 itself constitutes an inertia block sensitive to centrifugal force.

Figure 13:
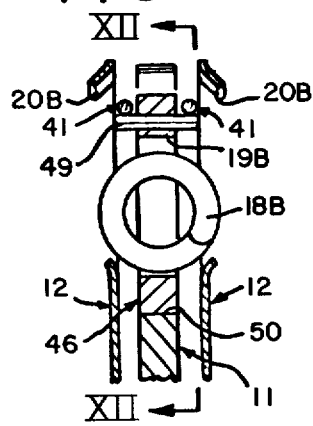

In the embodiment illustrated in FIGS. 12 to 14, the intervening element according to the invention is constituted by a portion 46 of the hub disc 11, which is wedge shaped, and which is detached from the running part of said hub disc, said portion comprising the port 19B in which the relevant spring 18B is partly engaged and being urged laterally by shoulders 47 which are mutually oblique, converging away from the axis of the assembly, and which are thus adapted to co-operate in wedging with complementary shoulders 48 provided for that purpose on the running portion of the hub disc 11; at rest, as illustrated in FIG. 18, circumferential clearances J'1, J'2 exist on either side between the shoulders 47 on the one hand and the shoulders 48 on the other hand.

Conjointly, the ports 20B of the guide washers 12 in which the spring 18B is likewise partly engaged are sufficiently radially elongate to permit a radial play of said spring, as will become apparent hereinbelow.

The return means associated with the intervening element 46 are constituted, in the exemplary embodiment illustrated, by a flexure spring 41 which is of the same type as that described hereinbefore with reference to FIGS. 8 to 10 and against which said intervening element 46 abuts by a stud 49 which it carries for that purpose and which projects on each of its faces.

In its standby retracted position the intervening element 46 is in abutment against a shoulder 50 of the running portion of the hub disc 11, and said shoulder is preferably of circular contour.

For low speeds of rotation, the intervening element 46 remains in contact with said shoulder 50, and at the end of the action of the axially effective elastic elements of low rigidity 18A it comes into abutment by its shoulder 47 against the shoulder 48 of the running portion of the hub disc 11 corresponding to the current direction of rotation when the corresponding circumferential clearance J'1 has been absorbed.

But at high speeds, the intervening element 46 moves radially, counter to its return spring 41, FIG. 14, and at the end of said movement it comes to be wedged between the shoulders 48 of the running part of the hub disc 11.

Thus wedged, it is as though it has been integrated with the running part of the hub disc 11, and therefore, abutting circumferentially against the latter, it then supplies a circumferential abutment to the relevant high rigidity spring 18B.

As previously, this has the result that the functional characteristics of the assembly are thereby modified.

Obviously, in the foregoing, the circumferential clearances J'1, J'2 have been assumed to correspond to the circumferential clearances J1, J2 previously specified.

But they could equally well differ from them.

In the variants of embodiment illustrated in FIGS. 15 to 24 there are associated with the intervening element 56 employed according to the invention, firstly an abutment element 57 which extends axially and with which, in the operative deployed position, it is adapted to come into positive circumferential abutment, and secondly an annular plate 58 which is engaged by recesses 59 upon the elastic elements 18A, 18B provided between the parts A, B of the friction means, without circumferential clearance for at least one of the latter, and with a circumferential clearance for the others, as will become apparent hereinbelow, and which constitutes a piece carrying either one of the elements intervening element 56/ abutment element 57, whereas the other of said elements is integral with a piece belonging to either of said parts A, B.

In practice, these FIGS. 15 to 24 illustrate by way of example the application of the invention to a friction means of the type described in the French patent filed on Apr. 24th, 1974 under No. 74 14147 and published under No. 2,268,994, and in the Addition filed on Aug. 20th, 1974 under No. 74 28507 and published under No. 2,282,577, attached to said patent.

Such a friction means is analogous to that previously described, although with the following differences: first of all the low rigidity springs 18A are fitted in opposition, one of said springs being compressed when the other is relaxed, and reciprocally, according to the direction of rotation; then the high rigidity springs are distributed into two groups 18B, 18B', the circumferential clearances J'1, J'2 associated with the springs 18B' being respectively greater than the circumferential clearances J1, J'1 associated with the springs 18B, so that the action of the springs 18B' is retarded with reference to that of the springs 18B in both directions of rotation.

In these embodiments there are two intervening elements 56 arranged in diametrally opposite positions, and an abutment element 57 is associated with each of them.

According to the embodiment illustrated by the FIGS. 15 to 19, said intervening elements 56 are carried by the part A, and more specifically by the hub disc 11, and the associated abutment elements 57 are carried by the annular plate 58.

But it is self-evident that an inverse arrangement could be adopted, the intervening elements 56 being carried by the annular plate 58 and the abutment elements 57 by the part A.

It is likewise self-evident that the part B could be substituted for the part A in either case.

In the exemplary embodiment illustrated in FIGS. 15 to 19, each intervening element 56 is carried by an elastically deformable arm 60 which extends circumferentially and which, at a distance from the intervening element 56, is integral with the piece which carries it, specifically the hub disc 11, said elastically deformable arm constituting in itself the return means associated with the intervening element 56 which it carries.

In the exemplary embodiment illustrated, such an elastically deformable arm 60 is constituted by a metallic web of radially relatively thin and axially relatively elongate cross-section, but it is self-evident that its cross-section could on the contrary be radially relatively elongate and axially relatively thin.

The corresponding intervening element 56 is constituted in this exemplary embodiment by a simple U-shaped return fold of the elastically deformable arm 60 which carries it, said fold being made on that side of said arm farther radially from the axis of the assembly, but it is self-evident that, as a variant, the intervening element 56 may be constituted by a piece distinct from the elastically deformable arm 60 which carries it, said piece being appropriately attached to said arm, e.g., by riveting.

For its integration with the piece of the friction means which carries it, and hence in practice with the hub disc 11, such an elastically deformable arm 60 is, in the exemplary embodiment illustrated, simply engaged by a buttonhole 62 upon a lug 63 of said hub disc 11, said lug extending radially and being prolonged by a retaining talon 64 which extends circumferentially partly overhanging with respect thereto, towards the corresponding intervening element 56, and which has a circumferential length C1 substantially equal to that of the latter.

The circumferential length C2 of the buttonhole 62 of the elastically deformable arm 60 is slightly greater than such a circumferential length C1 of the lug 63 and of the corresponding retaining talon 64, which permits its positioning by simple engagement: in a first stage the elastically deformable arm 60 is presented radially by its buttonhole 62 onto the retaining talon 64, then after crossing the latter, is rocked slightly towards the axis of the assembly so as to be able to be enaged under said retaining talon 64, and finally, it is moved circumferentially under the latter until it can be engaged radially on the lug 63.

Its maintenance is then assured, since the radial distance separating the retaining talon 64 from the peripheral edge of the hub disc 11 is only slightly greater than its thickness.

For the stationary configuration of the friction means, the free end of an elastically deformable arm 60 carrying the corresponding intervening element 56 is flattened elastically against the piece which carries it, and hence, specifically, against the peripheral edge of the hub disc 11, and for this stationary configuration of the friction means it is therefore under elastic pretension.

In the exemplary embodiment illustrated the elastically deformable arm 60 exhibits near the retaining talon 64 a deformation 65 which removes it locally from the peripheral edge of the hub disc 11.

In practice in this embodiment, the annular plate 58 associated with the intervening elements 56 is inserted axially between the hub disc 11 and the friction disc 15, in line with the radial part of the bearing 67 customarily inserted between said friction disc 13 and the corresponding guide washer 12 on the one hand, and the hub 10 on the other hand, and the recesses 59 which it comprises for its engagement on the springs 18A, 18B, 18B' are constituted by grooves which it exhibits on its internal periphery.

In the exemplary embodiment illustrated, it is upon the springs 18B that said annular plate 58 is engaged without clearance by its corresponding recesses 59.

In other words, in the case of the springs 18B, the recesses 59 are adjusted to the circumferential length of said springs, for the required engagement without clearance, said circumferential length corresponding to that defined by the corresponding ports 20B of the guide washers 12.

In the case of the springs 18A and 18B', on the other hand, the recesses 59 of the annular plate 58 overlap circumferentially on both sides of them.

Likewise, for the crossing of the axial columns 13, said annular plate 58 exhibits buttonholes 69 which said columns 13 cross with clearance.

Thus, in this embodiment, the assembly of the annular plate 58 is floating, said annular plate 58 being in contact radially in its own plane only with the springs 18B, by the radial edges of its corresponding recesses 59.

Such an arrangement advantageously permits the compensation of any possible production and/or assembly tolerances.

But is it self-evident that, if desired, a rigid centering of the annular plate 58 may be achieved, either by the axial columns 13 or by the bearing 67, by contact with such columns or such a bearing.

In the embodiment illustrated in FIGS. 15 to 19, the abutment elements 57 carried by the annular plate 58 for co-operation with the intervening elements 56 belong to one and the same axial crown 70 which is arranged radially in line with said intervening elements 56, beyond the latter, at the external periphery of said annular plate 58, and which exhibits for each intervening element 56 a groove 71 adapted for the engagement of such an intervening element 56.

The circumferential length C3 of such a groove 71 is considerably greater than the length C4 of the corresponding intervening element 56 so as not to interfere with the angular play between the parts A, B.

In the exemplary embodiment illustrated, the edge 72 of an abutment element 57 intended to cooperate with an intervening element 56, which is in practice one of the edges of the corresponding groove 71 of the crown 70, is bevelled and the corresponding edge 73 of such an intervening element 56 is itself bevelled in complementary manner.

In practice, for the stationary configuration of the friction means, the circumferential distance L between the edge 73 of an intervening element 56 and the edge 72 of the corresponding abutment element 57 corresponds at least, in the exemplary embodiment illustrated, to the angular clearance J1 specified hereinbefore.

In the absence of the intervening elements 56, the representative curve of the functioning of the clutch friction means in question would be, in the graph of FIG. 18, in which the angular play D between the two coaxial parts constituent of said friction means have been plotted as abscissa and the torque transmitted from one of its parts to the other as ordinate, under the same conditions as previously, the dash line curve I: when, for on haul operation, the friction means rotating in the direction of the arrow F1 in FIG. 15, a torque is applied to the friction disc 15 in the direction of said arrow F1, the low rigidity springs 18A are at first the only ones to act between the two parts A, B constituent of the friction means in order to transmit said torque; then, successively, first the springs 18B come into action for a value D1 of the angular play between the parts A, B in question of the corresponding friction corresponding to the absorption of the angular clearance J1 specified hereinbefore, and lastly the springs 18'B, for a value D2 of said angular play corresponding to the angular clearance J'1 likewise specified hereinbefore, said springs 18'B in turn becoming saturated for a value D3 of said angular play which hence constitutes the final value thereof; in the case of pull-back operation, an analogous process develops, after the absorption of the clearances J2 and J'2, and until the fresh saturation, but in the inverse direction, of the springs 18'B.

As previously, in the absence of the intervening elements 56, only the low rigidity springs 18A act in a neutral noise filtration zone P extending from the "on haul" angular play D1 to the "pull-back" angular play D'1.

Where, as is the case in point, intervening elements 56 are present, the low rigidity springs 18A continue to act in the neutral noise filtration zone P so long as the speed of rotation of the friction means remains low, and is e.g., below a value of the order of 900 r.p.m.: below such a value the intervening elements 56 are inoperative and they therefore permit freedom of action to the low rigidity springs 18A.

On the other hand, e.g., above 1,100 r.p.m., the intervening elements 56 move, by the effects of centrifugal force, from their standby retracted position, for which the free end of the elastically deformable arms 60 which carries them is in contact with the peripheral edge of the hub disc 11, FIG. 15, into an operative deployed position for which said free end of the elastically deformable arms 60 is distant from said peripheral edge of the hub disc 11, FIG. 17.

Then, as soon as the angular play between the two parts A, B constituent of the friction means attains a sufficient value, corresponding e.g., to the absorption of the angular clearance J1 marking the saturation of the low rigidity springs 18A, each locking element 56 engages in the corresponding groove 71 of the crown 70, said groove then being radially level with it, FIG. 17.

If the operation continues to be a "on haul" operation, i.e., if the torque to be transmitted between the constituent parts A, B of the friction means continues to increase, the angular play between said parts A, B continues to deploy, FIG. 19, up to its final value D3, in accordance with the process described hereinbefore.

On the other hand if, by relaxing the depressing action previously exerted upon the accelerator of the relevant vehicle, the operation of the assembly changes from such "on haul" operation to "pull-back" operation, and consequently the part A of the friction means constituted by the hub 10 and by the hub disc 11 undergoes a retrograde relative angular movement with reference to the part B of said friction means constituted by the guide washers 12 and by the friction disc 13, each intervening element 56 becomes hooked by its bevelled edge 73 upon the bevelled edge 72 of the abutment element 57 which is associated with it, i.e., in the exemplary embodiment illustrated, upon the bevelled edge 72 of the corresponding groove 71 of the crown 70, and the intervening elements 56, which also abut circumferentially upon said part A, since they are integral in rotation therewith, are then able, through the intermediary of the annular plate 58 with which they are engaged, to intervene in the relaxed deployment of the high rigidity springs 18B during such a change from an "on haul" mode of operation to a "pull-back" mode of operation, by offering a specific circumferential abutment to said springs 18B through the intermediary of the annular plate 58.

As previously, the functional characteristics of the friction means are thereby modified, the intervening elements 56 being substituted, through the intermediary of the annular plate 58, for the corresponding radial edges of the ports 19 of the hub disc 11 in which the high rigidity springs 18B are housed, and thus modifying the circumferential length of said ports: in practice, the representative curve of the functioning of the friction means is then the solid line curve II in the graph of FIG. 5, from which any filtration range due to the low rigidity springs 18A has been eliminated.

Obviously, this remains so as long as the speed of rotation of the friction means is above the value of 1,100 r.p.m., specified hereinbefore.

As soon as it falls below said value, the elastically deformable arms 60 return the intervening elements 56 into the standby retracted position.

As will be observed, and taking into consideration the deformation 65 which they comprise, the elastically deformable arms 60 come to bear against the crown 70 when the speed of rotation of the friction means is sufficient.

Then, in the case of "on haul" operation, beween e.g., the configurations of FIGS. 17 and 19, said elastically deformable arms 60 intervene in the internal friction of the friction means by virtue of their relative movement with reference to the crown 70 with which they are then in contact.

In the case of such "on haul" operation they therefore participate in the hysteresis of the friction means.

According to a development of the invention, such an intervention is utilized by accentuating it, and for this purpose each elastically deformable arm 60 is equipped with a friction means (not shown in the drawing) on its face confronting the crown 70.

As a variant, the crown 70 is equipped with such a friction means (likewise not shown in the drawing) on its internal face confronting the elastically deformable arms 60.

According to another variant not shown, a similar hysteresis is obtained by friction between the intervening elements 56 and the crown 70 for the low torque values.

As will readily be understood, the bevelling of the edge 73 of the intervening elements 56, and the complementary bevelling of the edge 72 of the associated abutment elements 57, are favourable to good hooking engagement on "pull-back" of said intervening elements upon said abutment elements, without undesirable disengagement.

The deformation 65 of the elastically deformable arms 60 carrying said locking elements 56 acts in the same sense.

Furthermore, as will be observed, in the embodiment of the invention illustrated in FIGS. 16 to 19 the annular plate 58 to be employed is relatively thin.

Consequently, and likewise taking into consideration the fact that the intervening elements 56 and the elastically deformable arms 60 which carry them do not in any way increase the axial size of the clutch friction means concerned, the performance of the invention in this case advantageously does not result in any appreciable increase in the axial dimension of said friction means.

In the foregoing, the elastic elements affected by the intervening elements according to the invention are the high rigidity springs 18B alone, the circumferential length L specified hereinbefore having an appropriate value for that purpose.

But it is self-evident that, depending upon the effects desired, said value L may be modified, e.g., so that the low rigidity springs 18A are likewise affected, or that the high rigidity springs 18B' are the only ones affected, the annular plate 58 being constructed accordingly.

Generally speaking, whatever the embodiment of the invention, the intervention of an intervening element according to the invention may occur upon any one of the elastic elements circumferentially interposed between the relevant parts A, B of the friction means, the details of execution being adapted accordingly.

According to the variant of embodiment illustrated in FIGS. 20 to 24, the intervening elements according to the invention are constituted by simple strips 76.

For their maintenance and their guidance, one of the parts A, B in question, the hub 10 of the part A in the example illustrated, carries radially a flange 77 which is integral therewith in rotation, said flange being e.g., by a technique known per se, made a force fit upon the hub 10 and crimped thereon, outside the volume formed by the guide washers 12, on one or the other side of the friction means.

Said flange 77 comprises two guides which are radially elongate, and with each of which a strip 76 is engaged.

In the exemplary embodiment illustrated, such a guide is constituted simply by a recess 78 of the flange 77, and the corresponding strip 76 is simply fitted slidingly in such a recess 77.

For the axial retention of a strip 76, two lamellae 75 are attached thereto, e.g., by welding, on either side of the flange 77, and said lamellae 75 overlap circumferentially to corresponding recess 78, FIGS. 21 and 23.

At the end of each recess 78, the flange 77 exhibits a retaining nose 79 which projects circumferentially into said recess 78, FIG. 21.

Conjointly, the abutment elements associated with the intervening elements 76 are constituted by lugs 80 which extend axially towards the flange 77, by virtue of passages 81 in the friction disc 15, and which are prolonged axially sufficiently to interfere with the path of the strips 76 in the recesses 78 in which they are slidingly fitted.

Said lugs 80 are carried by an annular plate 58 inserted axially between the hub disc 11 and the friction disc 15, and engaged by recesses 59 on the springs 18A, 18B, 18B' under the same conditions as hereinbefore.

Beyond a shoulder 82 adapted to co-operate in abutment with the corresponding retaining nose 79, each strip 76 comprises a radial prolongation 83 capable of being pinched circumferentially between said retaining nose 79 and the corresponding axial lug 80.

In practice, in the stationary position illustrated in FIG. 21, the circumferential distance L between the lateral edge 84 of a lug 80 the closest circumferentially to the corresponding retaining nose 79 on the one hand, and the lateral edge 85 of the corresponding strip 76 the farthest circumferentially from said retaining nose 79, on the other hand, corresponds angularly to not more than the angular clearance J1 defined hereinbefore.

And of course, each retaining nose 79 has a sufficiently short circumferential length not to oppose an engagement, opposite its own lateral edge, of the prolongation 83 of the corresponding strip 76.

In the exemplary embodiment illustrated the two strips 76 have in common the return means associated with them, and the latter are constituted by a torsion spring 86, the turns of which surround the hub 10, and the branches 87 of which are each respectively engaged, by an axial bend 88 with the strip 76, such a bend 88 being engaged in a passage provided in such a strip for said purpose and folded at its end beyond the latter.

At the internal periphery of the median torsion part of the spring 86, angle shaped strips 89 are added from place to place, e.g., by welding, to the flange 77, for the appropriate retention of said torsion spring.

Each strip 76 constitutes in itself an inertia block sensitive to centrifugal force.

The spring 86 which constitutes their return means is arranged so that, at standstill, FIGS. 21 to 22, each strip 76 occupies a standby retracted position in abutment against the floor of the corresponding recess 78 of the flange 77, in which it is inoperative; the spring 86 is also tared so as to retain the strips 76 in such a standby retracted position so long as the speed of rotation of the friction means remains below a definite value, e.g., of the order of 900 r.p.m.

Below the latter, the strips 76 therefore do not affect the characteristics of the friction means.

This is no longer the case above the speed value in question, as soon as the springs 18A are saturated, and therefore, the angular clearance J1 being absorbed, the axial lugs 80 constituting the abutment means are consequently displaced circumferentially with reference to the retaining noses 79 by an angle at least equal to said clearance, thus allowing free passage for the prolongations 83 of the strips 76.

In fact, due to the effects of centrifugal force, the strips 76 constituting the intervening elements according to the invention then come to occupy an operative deployed position wherein, due to the circumferential displacement specified hereinbefore for the axial lugs 80, they are radially in abutment by their shoulders 82 against said retaining noses 79 and have their prolongations 83 inserted circumferentially between the latter and said axial lugs 76, FIG. 24.

Then if, by relaxing the depressive action previously exerted upon the accelerator of the relevant vehicle, the operation of the assembly changes from a "on haul" mode of operation to a "pull-back" mode of operation, the strips 76, which abut circumferentially against the part A through the intermediary of the flange 77, are then capable of acting as previously, through the intermediary of the annular plate 58, upon the relaxed deployment of the high rigidity springs 18B, and consequently to modify the functional characteristics of the friction means as explained hereinbefore.

In fact, the lugs 80 constituting the abutment elements associated with said strips 76 then come to bear circumferentially by their lateral edge 84 against the corresponding lateral edge 85 of said strips.

As shown, a clearance may exist circumferentially between the prolongations 83 of the strips 76 and the retaining noses 79, the abutment of said strips 76 against the flange 77 occurring by their corresponding lateral edge in the recesses 78 of the flange 77; as a variant, the prolongations 83 of the strips 76 may bear circumferentially against the retaining noses 79, the latter then having a dual function of circumferential abutment and of radial retention.

Of course, as soon as the speed of rotation of the friction means falls back below 900 r.p.m., the spring 86 returns the strips 76 into the standby retracted position.

FIGS. 25 to 32 illustrate schematically various variants of embodiment and/or of application.

Figure 25:
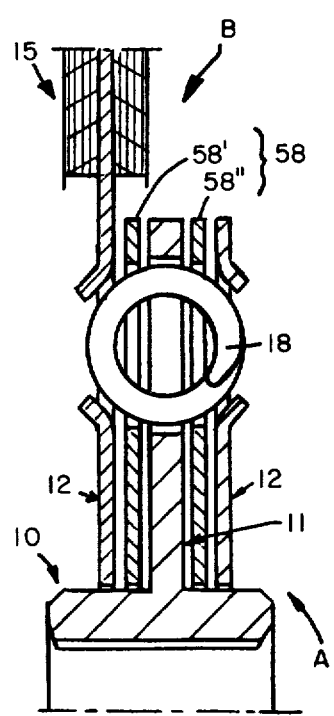
Figure 26:
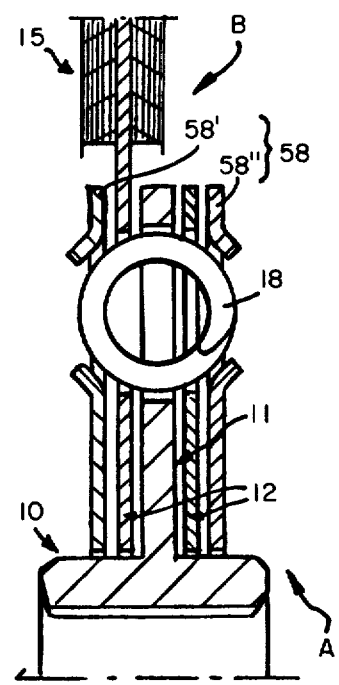

According to FIGS. 25 and 26, the annular plate 58 is divided into two elementary plates 58', 58", which are mutually connected in the manner of the guide washers 12 by axial columns, not visible in the drawing, with the advantage of better operating conditions for the springs used.

Said elementary plates 58', 58" are placed inside the volume formed by the guide washers 12 in FIG. 25, on either side of the hub disc 11, and outside said volume in FIG. 26.

In both cases the intervening elements and the abutment elements according to the invention act indiscriminately between them and either of the parts A, B of the relevant friction means.

In the foregoing, the hub disc 11 is integral with the hub 10 and the friction disc 15 is integral with the guide washers 12.

Figure 27:
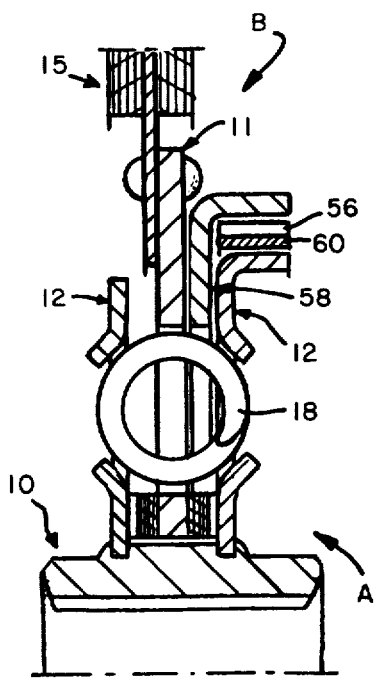
Figure 28:
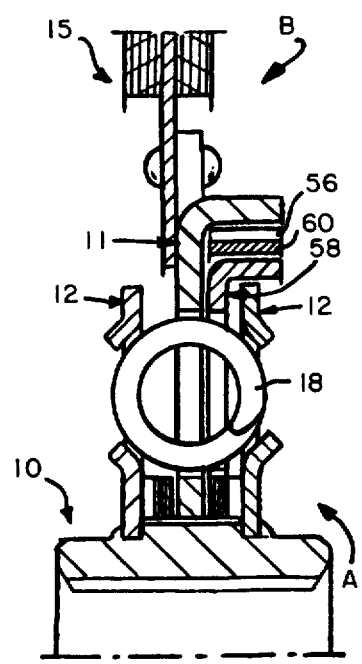

In the variants of embodiment illustrated in FIGS. 27 and 28, an inverse arrangement is adopted: the guide washers 12 are integral with the hub 10, and the friction disc 15 is carried by the hub disc 11, the latter being mounted freely rotatably about the hub 10, within the limits of a definite play by the elastic elements 18 employed.

In the embodiment illustrated in FIG. 27 the intervening and abutment elements according to the invention, which are by way of example of the type previously described with reference to FIGS. 15 to 19, act between an annular plate 58 and a guide washer 12.

As a variant, FIG. 28, they act between an annular plate 58 and the hub disc 11, the latter having, by cutting and folding, axial prolongations appropriate to the constitution of abutment elements of the type required.

Figure 29:
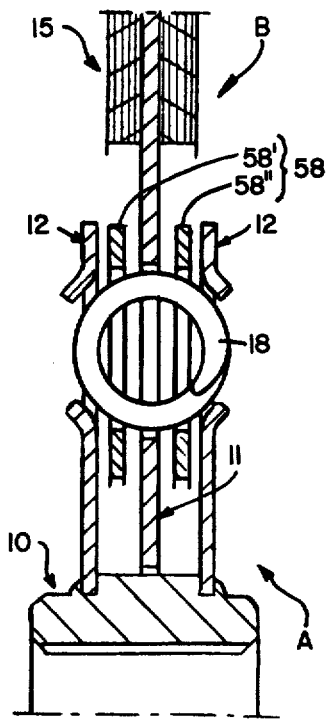
Figure 30:
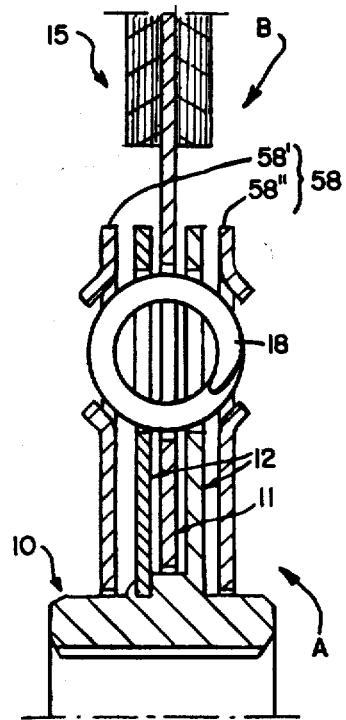

In the exemplary embodiments illustrated in FIGS. 29 and 30, which likewise relate to the case where the guide washers 12 are integral with the hub 10, the annular plate 58 employed is divided into elementary plates 58', 58" which are arranged inside the volume formed by the guide washers 12, FIG. 29, or outside said volume, FIG. 30.

Figure 31:
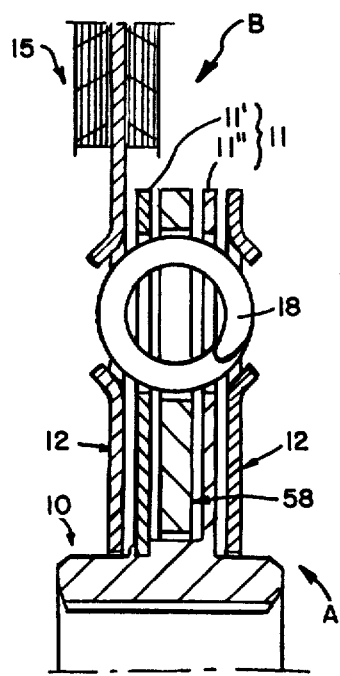
Figure 32:
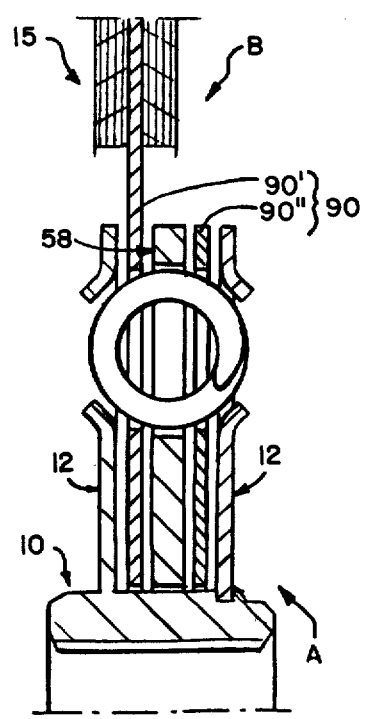

In the variants of application illustrated in FIGS. 31 and 32, the annular plate 58 employed occupies a central position, whether, FIG. 31, the hub disc 11 is divided into two elementary hub discs 11', 11" inside the volume formed by the guide washers 12, the latter carrying the friction disc 13, or, FIG. 32, the guide washers 12 are integral with the hub and the disc 90 of the friction disc 15 is itself divided into two elementary discs 90', 90" each respectively arranged on either side of the annular plate 58.

From the foregoing it will readily be understood that the invention is capable of being embodied in a wide variety of applications.

It is therefore not limited to the embodiments and applications more particularly described and illustrated, but embraces all variants.

Particularly, it may equally well be applied to the torsion damping device comprising three coaxial parts mounted mutually rotatably two by two, such as is the case e.g., of the clutch friction means described in detail in the French patent filed on Aug. 29th 1973 under No. 73 31172 and published under No. 2,242,606, and in the Addition filed on Apr. 12th 1974 under No. 74 12915 and published under No. 2,270,491 attached to said patent.

In such a friction means, the intervening element according to the invention may act between any one of the various rotary coaxial parts which it comprises.

Moreover, instead of acting during a change from on haul operation to pull-back operation, the intervening element according to the invention may equally well act during the change from pull-back operation to on haul operation; in the case e.g., of the embodiment illustrated in FIG. 8, it is only necessary for the positioning of the relevant pieces to be symmetrical to that shown with reference to the relevant spring 18B.

Lastly, the field of application of the invention is obviously not limited solely to that of clutch friction means for motor vehicles, but extends to the entire field of torsion damping devices.

I claim:

1. A torsion damping assembly of the type including at least two coaxial parts mounted for relative angular movement within predetermined limits of angular displacement, circumferentially acting resilient elements opposing said relative angular movement over at least a range of said angular displacement, the improvement comprising at least one intervening means responsive to centrifugal force for movement between a standby position and an operative position above a predetermined speed of rotation, return means urging said intervening means from said operative position back toward said standby position, said intervening means effectively circumferentially bearing against one of said coaxial parts to define a circumferential abutment for one of said resilient elements in said operative position for modifying the operational characteristics of said torsion damping assembly.

2. The torsion damping assembly of claim 1, wherein said intervening means is carried by said one coaxial part, said intervening means defines said circumferential abutment for said one resilient element.

3. The torsion damping assembly of claim 2, wherein said intervening means is pivotally mounted on said one coaxial part about an axis parallel to the axis of said torsion damping assembly.

4. The torsion damping assembly of claim 3, wherein said circumferential abutment of said intervening means comprises a nose member for circumferentially hooking said one resilient element in said operative position.

5. The torsion damping assembly of claim 3, wherein said circumferential abutment of intervening means comprises a cam surface cooperable with said one resilient element.

6. The torsion damping assembly of claim 2, wherein said intervening means is generally radially movable on said one coaxial part and comprises circumferentially opposed sides respectively cooperating with stop means fixed to said one coaxial part and defining said circumferential abutment.

7. The torsion damping assembly of claim 6, wherein said circumferentially opposed sides of said intervening means are inclined relative to each other.

8. The torsion damping assembly of claim 1, said coaxial parts respectively comprising annular components parallel to each other, said resilient elements being individually housed partly in an aperture in the annular component of a first of said coaxial parts and partly housed in an aperture in the annular component of said coaxial parts, wherein said intervening means comprises a generally wedge-shaped member on the annular component of one of said coaxial parts, said wedge-shaped member defining an aperture for partly receiving said one resilient element, lateral inclined sides of said wedge-shaped member being cooperable with complementary inclined edges on said annular component of said one coaxial part.

9. The torsion damping assembly of claim 1, wherein said circumferential abutment is defined on an abutment member associated with said intervening means, said abutment member extending axially and in positive circumferential abutment with said intervening means in said operative position, and an annular plate having recesses receiving said resilient elements and in circumferential engagement with at least said one resilient element and defining circumferential displacement with the other of said resilient elements, said annular plate carries a selected one of said intervening means and said abutment member and the nonselected one of said intervening means and said abutment member being fixed to said one coaxial part.

10. The torsion damping assembly of claim 1, wherein said intervening means is carried by a circumferentially extending elastically deformable arm, said elastically deformable arm defining said return means for said intervening means.

11. The torsion damping assembly of claim 10, wherein said elastically deformable arm comprises a leaf spring member relatively thin in the radial direction and relatively wide in the axial direction.

12. The torsion damping assembly of claim 10, wherein said intervening means comprises a folded over end portion of said elastically deformable arm.

13. The torsion damping assembly of claim 10, or 11, wherein said elastically deformable arm has a slotted portion and is mounted by a radial lug extending through said slotted portion, a circumferentially extending cantilevered retaining portion on said lug, the circumferential dimension of said retaining portion being substantially equal to that of said lug itself.

14. The torsion damping assembly of claim 10 or 11, wherein said elastically deformable arm is preloaded toward said standby position to oppose movement of said intervening means toward said operative position.

15. The torsion damping assembly of claim 10 or 12, wherein said abutment member has a beveled edge cooperable with said intervening means in said operative position.

16. The torsion damping assembly of claim 15, wherein said intervening means has a beveled edge complementarily to that of said abutment member.

17. The torsion damping assembly of claim 10 or 11, wherein said abutment member is part of annular member, said annular member being disposed radially outwardly of and aligned with said intervening means and having a groove for receiving said elastically deformable arm.

18. The torsion damping assembly of claim 17, wherein said elastically deformable arm and said annular member are in friction contact.

19. The torsion damping assembly of claim 1, wherein said intervening element and said annular member are in friction contact.

20. The torsion damping assembly of claim 9, wherein said intervening element is mounted for movement in a guide, said abutment member being disposed in the path of movement of said intervening means in said guide.

21. The torsion damping assembly of claim 20, wherein intervening means if formed as a plate member and said guide comprises a radially extending recess in a flange, said plate member being slidingly mounted in said recess.

22. The torsion damping assembly of claim 21, wherein said flange has a retaining portion protruding into said radial recess at the radially outer end thereof beyond a shoulder cooperable for radial abutment with said intervening means, said intervening means having a radial protrusion for abutment against said abutment member.

23. The torsion damping assembly of claim 20, 21 or 22 wherein said guide belongs to said one coaxial part and said abutment member is carried on said annular plate.

24. The torsion damping assembly of claim 1, wherein at least a pair of said intervening means are disposed in diametrically opposite directions.

25. The torsion damping assembly of claim 23, wherein at least one pair of said intervening means are disposed in diametrically opposite positions, said return means being common to both said pair of intervening means, said return means comprising a torsion spring with two branches respectively attached to said pair of intervening means.

26. The torsion damping assembly of claim 1, wherein the number of resilient members controlled by said interposition means is such that a radial component is produced in said torsion damping assembly.

27. The torsion damping assembly of claim 1, wherein all of said resilient members are controlled by such intervening means.

28. A torsion damping assembly of the type including at least two coaxial parts mounted for relative angular movement within predetermined limits of angular displacement, said coaxial parts comprising respective parallel annular components, circumferentially acting resilient elements opposing said relative angular movement over at least a range of said angular displacement, each of said resilient members being housed partly in an aperture formed in the annular component of one of said coaxial parts and partly in an aperture formed in the annular component of the other of said component parts, said apertures having circumferentially opposed radial edges, the improvement comprising intervening means responsive to centrifugal force for movement between a standby position and an operative position above a predetermined speed of rotation, return means for urging said intervening means from said operative position toward said standby position, said intervening means effectively taking the place of one of the radial edges of one of said apertures housing one of said resilient members in said operative position of said intervening means.

* * * * *